United States Patent Office 3,351,457
Patented Nov. 7, 1967

3,351,457
HERBICIDAL COMPOSITION AND METHOD
Raymond W. Luckenbaugh, Wilmington, Del., assignor to E. I. du Pont de Nemours and Company, Wilmington, Del., a corporation of Delaware
No Drawing. Original application Dec. 2, 1964, Ser. No. 415,484, now Patent No. 3,309,192, dated Mar. 14, 1967. Divided and this application Mar. 7, 1966, Ser. No. 532,106
The portion of the term of the patent subsequent to Mar. 13, 1984, has been disclaimed
13 Claims. (Cl. 71—120)

This application is a divisional of my application Ser. No. 415,484, filed Dec. 2, 1964, now U.S. Patent No. 3,309,192, which is a continuation-in-part of my U.S. applications Ser. Nos. 272,865 and 272,834, both filed Apr. 15, 1963 (now abandoned), which are continuation-in-part applications of my U.S. applications Ser. Nos. 221,299 and 221,331, both filed Sept. 4, 1962 (now abandoned), which are continuation-in-part applications of my U.S. application Ser. No. 188,981, filed Apr. 20 1962 (now abandoned). It is also a continuation-in-part of my U.S. application Ser. No. 322,074, filed Nov. 7, 1963 (now abandoned).

This invention relates to a method of destroying weeds. More specifically, it refers to a method of selectively controlling crabgrass and other germinating and seedling weed grasses by applying a growth retardant amount of a 1-cycloalkyl-3-phenylurea to these germinating and seedling grass plants.

I have discovered that by applying such a cycloalkylphenylurea in a pre-emergence or post-emergence treatment to an area in which crabgrass is growing there results a marked growth retardation of the germinating or seedling crabgrass plant. This retardation of growth is caused by a compound of this invention's effect on the crabgrass root system. The crabgrass root system fails to grow and develop in a normal manner. Established and germinating turf grasses such as Kentucky bluegrass, bentgrass and creeping fescues show only slight temporary retardation of growth and no injury. Therefore, crabgrass growing in a lawn treated with a compound used in this invention is soon crowded out by desirable plants or destroyed by lack of an adequate supply of water and minerals necessary to sustain life.

An outstanding feature of the cycloalkylphenylureas used in this invention is their truly selective pre-emergence elimination of several annual seedling grasses from other grasses. For example, treatment at the time of seeding a new turf will control crabgrass and some other annual grasses without injury to the germinating seeds of common temperature-region turf species. The extent of this tolerance of desirable turf grasses has been most strikingly demonstrated by the successful dry application of mixtures of turf seed and chemical to a prepared seedbed. Such applications have controlled annual weed grasses yet permitted the normal establishment of the new turf.

The selective control of some grasses with safety to seeds and seedlings of other grasses also extends to field crops. Applications pre-emergence to the crop have controlled such weeds as crabgrass, foxtail and downy brome without significant injury to such cereals as wheat and rice.

It is well recognized by home lawn owners that crabgrass is one of the most difficult weeds to eliminate from a lawn. Its branching root system firmly anchors the plant in the soil. Minerals and water needed by lawn grasses are used for the growth of the crabgrass plant and the development of lawn grasses in the immediate area of the crabgrass is slowed. By applying a compound used in my invention home lawn owners can now plant lawn seeds in the spring without fear that crabgrass will crowd out lawn grasses before they become established.

If crabgrass appears on already established turf, an application of a compound used in this invention will retard the growth of the newly emerged crabgrass so that the established lawn grasses can crowd out the crabgrass.

Inasmuch as the crabgrass growing in a well-watered lawn remains green until the desirable lawn grasses begin growing near the crabgrass plant, the lawn owner is not plagued with objectionable brown patches which mar the beauty of his lawn. In effect the home lawn owner is destroying crabgrass without leaving a scar on his lawn. Heretofore known methods of removing crabgrass, such as with pre-emergence or post-emergence crabgrass herbicides and hand picking, have not been able to accomplish this amazing result.

Specifically, the compounds used in this invention which have the ability to control the growth of crabgrass and other germinating and seedling weed grasses are represented by the formula:

1. 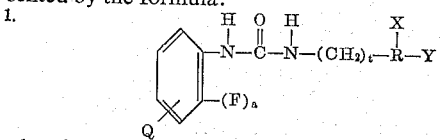

wherein:

R is a saturated cycloalkyl group containing 5 through 8 carbon atoms or saturated bicycloalkyl group of 7 through 8 carbon atoms;

X and Y are the same or different and are hydrogen, halogen, methyl or ethyl;

$a$ is 0 or 1;

$t$ is 0 or 1;

Q is hydrogen or methyl; and with the limitation that when R is cycloheptyl, cyclooctyl or bicycloalkyl, Q must be in the meta position if methyl and X and Y are separately hydrogen, halogen or methyl.

The substituted and unsubstituted cyclopentyl and cyclohexyl phenylureas cause marked growth retardation of crabgrass growing in established lawns containing perennial grasses.

The cyclohexyl phenylureas of the following structure exhibit outstanding selectivity in retarding the growth of crabgrass around dicotyledonous plants and desirable perennial grasses grown from seed.

2. 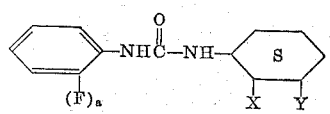

wherein:

X and Y are the same or different and are hydrogen, halogen, methyl or ethyl; and $a$ is 0 or 1.

The 1-cyclooctyl-3-phenylureas of the following formula are particularly effective in retarding the growth of crabgrass without having an effect on other common lawn grasses:

3. 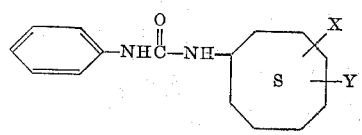

wherein:

X and Y are the same or different and are hydrogen, halogen or methyl.

The 1 - methylcycloalkyl-3-phenylureas are especially safe to use at even high rates on Kentucky bluegrass, bentgrass and creeping red fescue.

The 1-methylcycloalkyl-3-(m-tolyl)ureas retard crabgrass growth in agronomic and horticultural crops such as cucumbers, potatoes, squash, eggplant, tomatoes, peppers, red beets, cotton, soybeans, corn, alfalfa, peanuts and the like.

Particularly preferred compounds because of their outstanding action in retarding the growth of crabgrass at extremely low rates are:

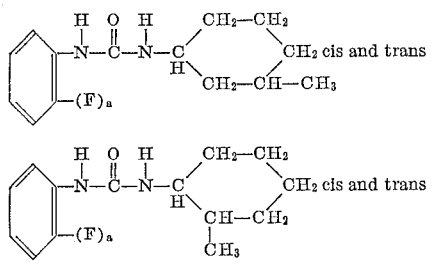

wherein $a$ is 0 or 1.

Compounds used in my invention retard the growth of many annual weed grasses and some perennial weed grasses such as Johnson grass, Bermuda grass and the like. I have noticed that the effect on perennial weed grasses is often limited to plants growing from seed. If the perennial weed has developed rhizomes the compound has a less pronounced effect on the plants.

The following representative list sets forth weed grass plants exhibiting retarded growth approximately two weeks after a pre-emergence application of a compound used in this invention.

Common name: Gramineae
    Crabgrass _____ Digitaria spp.
    Annual brome _____ Bromus brizaeformis.
    Downy brome
      or cheat _____ Bromus tectorum.
    Smilo grass _____ Orizopsis miliacea.
    Medusa's head
      wild rye _____ Elymus caput-medusae.
    Switch grass _____ Panicum virgatum.
    Dallis grass _____ Paspalum dilatatum.
    Bahia grass _____ Paspalum notatum.
    Pearl millet _____ Pennisetum glaucum.
    Johnson grass _____ Sorghum halepense, Sorghum almum.
    Sudan grass _____ Sorghum sudanense.
    Barnyard grass _____ Echinochloa crusgalli.
    Giant foxtail _____ Setaria faberii.
    Fall panicum _____ Panicum dichotomiflorum.
    Nimble will _____ Muhlenbergia schreiberi.

An annual grass is defined in the Journal of the Weed Society of America, vol. 10, #3, July 1962, as any grass plant that completes its life cycle from seed in one year.

For the purposes of this specification, the plants of the above list including the annual weed grasses and perennial weed grasses growing from seed such as Bermuda grass, nimble will and Johnson grass are stated generically to be "seedling weed grasses."

Weeds are defined as any unwanted plant. For the purposes of this specification it is assumed that annual grasses that are commonly cultivated such as ryegrass, wheat, barley and oat are not weeds.

A wide range of plants are not seriously injured by the compounds used in this invention. Accordingly, the above weeds are controlled selectively, i.e., without substantial adverse effect on the majority of species in the plant kingdom. Examples of vegetation that are not seriously injured by the compounds used in my invention include the turf grasses described above; annual crop grasses such as wheat, sorghum, corn and rice and perennial crop grasses such as sugar cane; ornamental such as marigolds, tulip, arbor vitae, azalea, boxwood, camellia, flowering crab, deutzia, forsythia, Chinese holly, Japanese holly, Tartarian honeysuckle, privet, pyracantha, climbing rose, tea rose, spiraea and other shrubs; trees such as oaks, Q. alba, Q. borealis and Q. velutina, beech, dogwood, hickory, Norway spruce, black gum, sweet gum, tulip tree, maple and pine; and broadleaf crops such as beets, eggplant, flax, green beans, lima beans, okra, peppers, red beets, safflower, soybeans, spinach, sugar beets, alfalfa, clover, lespedeza, tobacco, peanuts, carrots, tomatoes, squash, cucumber, potatoes and cotton.

Established plants of many plant species particularly those past the three leaf stage are not affected by the compounds used in my invention.

PREPARATION

The 1-cyclohexyl-3-phenylureas can be made in the manner described in Beaver et al., J. Am. Chem. Soc., 79, 1236 (1957). Substitutions on the cyclohexyl ring can be made by methods well known in the art. 1-phenyl-3 - (2 - [cis],4[trans]-dimethylcyclohexyl)urea and 1-phenyl - 2-(3-[trans],4[cis]-dimethylcyclohexyl)urea can be made in the manner described in A. Skita, Ann 427, 255 (1922) and in Chem. Abstracts, 16, 2321 (1922). 1-methylcyclohexyl-3-phenylurea can be made in the manner described by P. Mailhe, Compt. rend., 174, 465 (1922) and in Chem. Abstracts, 16, 1942, (1922). Additionally, the following compounds can be made in the manner described by A. Skita in Ber. 56B 1014 (1923) or Chem. Abstracts, 17, 3174 (1933).

1-phenyl-3-cis(2-methylcyclohexyl)urea
1-phenyl-3-trans(2-methylcyclohexyl)urea
1-phenyl-3-cis(3-methylcyclohexyl)urea
1-phenyl-3-trans(3-methylcyclohexyl)urea
1-phenyl-3-cis(4-methylcyclohexyl)urea
1-phenyl-3-trans(4-methylcyclohexyl)urea The method for making these amino intermediates for the manufacture of other compounds used in this invention can be made by consulting Beilstein 12 (I) page 113 to page 118 (1933). This reference describes the manufacture of the following intermediates: cyclopentylamine, cyclohexylamine, 3-amino-1-methylcyclopentane and cyclooctylamine. On pages 7 to 10 of Beilstein 12 (1929), the preparation of the following intermediates is described: 1-amino-1-methylcyclopentane, 2-amino-1-methylcyclopentane, cycloheptylamine and 1-amino-1-methylcyclohexane. The following intermediates can be made by consulting Beilstein, 12 (II) pages 14 to 22 (1950):

2-chloro-1-aminocyclohexane
2-bromo-1-aminocyclohexane
3-bromo-1-aminocyclohexane
2-amino-1-methylcyclohexane (cis and trans)
3-amino-1-methylcyclohexane (cis and trans)
4-amino-1-methylcyclohexane (cis and trans)
2-amino-1,3-dimethylcyclohexane (cis, cis, cis)
2-amino-1,3-dimethylcyclohexane (cis, cis, trans)
4-amino-1,3-dimethylcyclohexane (trans, cis, trans)
5-amino-1,3-dimethylcyclohexane (cis, cis, cis)
2-amino-1,4-dimethylcyclohexane (cis, cis, cis)
2-amino-1,4-dimethylcyclohexane (cis, cis, trans)
2-amino-1,4-dimethylcyclohexane (trans, cis, trans)

Bicyclic amines are readily accessible from diene adducts. Some examples of bicyclic amine intermediates are as follows:

Alder et al., Ber., 71B, 2451 (1938), endo norbornylamine, exo norbornylamine, 3-methylnorbornylamine,
Semmler et al., Ber., 41, 866; and Ber., 41, 127, 4-amino-2-methylbicyclo[1,2,3]octane, 2-amino-1,7-dimethylbicyclo[1,2,2]heptane
Komppa, Ann., 366, 75, 3-amino-2,2-dimethylbicyclo[1,2,2]heptane
Beilstein, 12, 1st supplement, 125 (1933), 5-amino-2,2-dimethylbicyclo[1,2,2]heptane Seka et al., Ber., 75, 1379, 2-amino-bicyclo[2,2,2]octane
Komppa et al., Ann., 512, 172, 2-aminobicyclo[1,2,2] heptane The ring halogenated amines can be prepared by the procedure described in British Patent 885,878, published Dec. 28, 1961. This consists of halogenation of the hydrogen halide or sulfate salts in carbon tetrachloride. The exact position of the halogen is not known. Mono and dihalogenated products are obtained by controlling the amount of halogen added.

The alkyl substituted cyclohexylamines are easily prepared by catalytic hydrogenation of the alkyl anilines.

Typical of the method of preparation of the compounds of this invention is the reaction of the phenyl or substituted phenylisocyanate with the appropriate amine in an inert solvent such as toluene. The exothermic reaction is usually controlled by the rate of addition of the isocyanate to the amine or by external cooling. The products can be isolated by evaporation of the solvent from the reaction mixture, or by diluting the reaction mixture with an aliphatic hydrocarbon such as n-pentane. The products are crystalline solids. For example, phenylisocyanate reacts with cyclooctylamine to yield a novel crystalline solid which melts at 154–155° C.

Mixtures of isomers can also be used in the procedures of this invention. The economical means of preparing the cycloalkylamines, such as 2- or 3-methylcyclohexylamine, results in a mixture of cis and trans isomers. No separation of the isomers is needed.

It is interesting to note that the compounds used in this invention have low solubility in water. Therefore, they will not ordinarily disappear rapidly from the soil due to rain or high soil moisture content.

The compounds of this invention also form 1/1 addition compounds with acids, for example, such acids as described in my United States application Ser. No. 161,410, filed Dec. 22, 1961. Particularly of interest are trichloroacetic acid and dodecylbenzenesulfonic acid.

The addition compounds can be prepared by mixing equal molar proportions of the acid and urea in an inert anhydrous solvent such as xylene at room temperature.

Additionally, phenol cycloalkylphenylurea complexes are formed from phenols which are described in Cupery U.S. Patent No. 2,705,195.

COMPOSITIONS

Compositions of this invention comprising a compound used in this invention together with one or more surface-active agents.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set out, for example, in Searle U.S. Patent 2,426,417; Todd U.S. Patent 2,655,447; Jones U.S. Patent 2,412,510; or Lenher U.S. Patent 2,139,276. A detailed list of such agents is set forth in "Detergents and Emulsifiers Annual" (1964) by John W. McCutcheon, Inc.

Suitable surface-active agents for use in compositions of the present invention are: polyethylene glycol fatty acid esters and fatty alkylol amide condensates, alkylaryl sulfonates, fatty alcohol sulfates, dialkyl esters of sodium sulfosuccinate, fatty acid esters of sodium isethionate, polyoxyethylene ethers and thioethers and long chain quaternary ammonium chloride compounds.

Surface-active dispersing agents such as sodium lignin sulfonates, low viscosity methyl cellulose, polymerized sodium salts of alkylnaphthalene sulfonic acids are also suitable in the herbicidal compositions of this invention.

Among the more preferred surfactants are the anionic and non-ionic type. Among the anionic surface-active agents, preferred ones are alkali metal or amine salts of alkylbenzene sulfonic acids such as dodecylbenzene sulfonic acid, sodium lauryl sulfate, alkylnaphthalene sulfonates, sodium N-methyl-N-oleoyltaurate, oleic acid ester of sodium isethionate, dioctyl sodium sulfosuccinate, sodium dodecyldiphenyloxide disulfonate. Among the nonionic compounds, preferred members are alkylphenoxy poly(ethyleneoxy)ethanols such as nonylphenol adducts with ethylene oxide; trimethylnonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10% by weight of the surface-active agents will be used in compositions of this invention and ordinarily the amount of surface-active agents will range from 1–5% but may even be less than 1% by weight.

Additional surface-active agents can be added to the above formulation to increase the ratio of surface-active agent:active agent up to as high as 5:1 by weight. Normally the purpose of adding higher amounts of surfactant is to increase the growth retardant effect of the active compounds. When used at higher rates it is preferred that the surfactant be present in the range of one fifth to five parts surfactant for each one part of active agent.

Plant growth retardant compositions of this invention can contain, in addition to a surfactant, finely divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

Preferred diluents are clays of hydrated aluminum silicate, hydrated aluminum magnesium silicate and hydrated aluminum magnesium iron silicate.

The amount of the finely divided inert solid diluent can vary widely but will generally range from 10 to 98% by weight of the growth retardant composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 50% of a cycloalkylphenylurea.

The cycloalkylureas of this invention can also be formulated as high strength compositions in which the active ingredient may be present in amounts ranging from 90–99%. The remainder of the composition comprises surface-active agents, preferably in amounts of from 0.2 to 2% and diluents, as described above. Such compositions are prepared by blending and grinding the ingredients to obtain a homogeneous powder of fine particle size.

Compositions of these plant growth retardants and inert solid diluent can also be formulated into granules and pelelts. In such compositions, the diluent will generally range from 65 to 99% and the active ingredient can range from 1 to 35%. It should be understood that it will not be necessary to include a surfactant in the granular and pelletized composition. To prepare granules the herbicides can be dissolved in a solvent, and this solution can be sprayed over pre-formed clay granules, expanded vermiculite or the like while agitating the mixture to distribute the active ingredient over and throughout the granular mass. Such granules can range in particle size of from +60 mesh to +4 mesh, and an active ingredient content of 1 to 6% is preferred. It is also possible to make such granules by mixing the finely divided diluent and finely divided herbicide, for instance by grinding together, and then forming granules by adding water, tumbling and drying the resulting spheres.

Pellets can be prepared by extruding a mixture that comprises the cycloalkylphenylureas, pelleting clay diluent and water into strands, cutting these, and drying the product. Pellet size can range from 10 mesh to larger shapes such as ⅜ inch cubes. Pellets preferably contain from 5 to 35% of the cycloalkylphenylureas. In addition to the diluents, pelletized and granular compositions can contain additives such as binders, surfactants and the like.

In addition to the formulation described above, suspension concentrates can also be prepared. These formulations are prepared by wet milling the ingredients; i.e., ball milling or by sand grinding using the method described in Hochberg U.S. Patent 2,581,414, issued Aug. 19, 1948 or Littler U.S. Patent 3,060,084 issued Oct. 23, 1962. Using the methods described in these patents, fine particles of the active compounds within the scope of this invention will be dispersed evenly in a diluent. Such compositions normally contain from 15 to 50% active ingredient and are characterized by having particles which are substantially less than 5–20 microns in diameter.

Water extendable oil compositions can also be employed with one or more of the cycloalkylphenylureas of this invention. In these plant growth regulant compositions, surface-active agents and an oil form a liquid which can be conveniently poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. These oil formulations can be either dispersions of the cycloalkylphenylureas in finely divided form in non-solvent carriers, or they can be solutions in solvent carriers. A non-solvent carrier is an oil in which the urea has low solubility, for instance less than about 0.1% at 25° C. Many aliphatic hydrocarbons are examples of such non-solvent carriers. Solvent carriers include toluene, kerosene, xylene, alkylated naphthalenes, DMF, N-methylpyrrolidone, cyclohexanone, isophorone and the like. Preferably, the oils should be water immiscible and be of a type in which the active agent will be soluble in the amounts used in particular formulations. The dispersions are prepared by wet-milling the ingredients, for example, in a ball mill or sand mill. The solutions are prepared by blending and agitating the ingredients, possibly with application of heat.

In these emulsifiable oil concentrates, the cycloalkylphenylureas will be present in amounts ranging from 5 to 35% by weight. Precise concentrations of active agent, of course, will depend on the intended use of the composition. When mixed with water at the point of application the oil concentrate will be diluted so that in the final formulation the active agent will be present in amounts ranging from 0.5% to 2% by weight. It will be understood that foliage application of the emulsifiable compositions will have utility for regulating the growth of several undesirable annual grass species along highway and railroad rights-of-way, as well as other locations.

It is, of course, also possible to use such oil compositions of cycloalkylphenylureas by extending them with other oils, for example, diesel oil, herbicidal oil, and the like for uses such as weed control on railroad rights-of-way.

The active cycloalkylphenylureas used in my invention can also be formulated with perennial grass seeds to obtain dry coated seeds. Germination of perennial grass seed such as Kentucky bluegrass and fescues is not hindered. Crabgrass seeds situated near the coated perennial seeds will not produce adult crabgrass plants.

Stickers can be employed to attach finely ground or pulverulent cycloalkylphenylureas to the seed surface. The stickers can be selected from a broad class of adhesives, gums, resins and film-forming latexes. Aqueous solutions of natural and synthetic gums and resins can be employed such as gum Arabic, gum tragacanth, Guar gum, ammonium or alkali metal alginates, ammonium or alkali metal acrylates, polyvinyl alcohol, cellulose derivatives, such as hydroxyethyl cellulose or methyl cellulose and the like. Suspensions and solutions of starch and starch derivatives can also be used. Among the film-forming latexes that are useful as stickers are natural or synthetic rubber latex, polystyrene latex, polyacrylate latex, polyethylene latex and the like. Among these latexes a modified polyacrylic latex sold under the trade name of "Rhoplex" and a polyethylene latex sold under the trade name of "Plyac" are preferred. Water-soluble adhesives such as those which are conventionally used in paper manufacture can be employed advantageously. Clays that have binding action such as montmorillonite can also be employed.

The amount of sticker required in the compositions of this invention can range from 0.25% to 50% by weight based on the weight of the cycloalkylphenylurea. Generally a level of 1 to 10% by weight of sticker based on the weight of the cycloalkylphenylurea is preferred.

APPLICATION

The compounds of this invention are applied directly to the soil as pre-emergence or as post-emergence treatments or to grass foliage as a post-emergence treatment. They also can be mixed intimately with the soil in pre-emergence treatments. Rates of application can be in the range of ½ to 20 pounds per acre and will preferably be used at the rate of 1 to 15 pounds per acre to control the seedling weed grasses described above. Rates as high as 24 pounds have been used in tests on established turf grasses without undesirable injury.

More specifically, as a pre-emergence application on crop lands, 2 to 8 pounds per acre of a compound used in this invention will control the growth of weed grasses. There is a good safety margin to crop plants such as cucumbers, cotton, potatoes, flax, squash, lima beans, corn, eggplants, red clover, ryegrass, tomatoes, lespedeza, peppers, soybeans, red beets, alfalfa, sugar beets, green beans, carrots, peanuts, okra and the like. The weed grass usually emerges and then fails to develop, showing symptoms of severe growth retardation. It is particularly surprising to note that the compounds used in the invention retard a weed grass such as crabgrass without harming cultivated annual grasses such as ryegrass.

As an application on established growing lawns before a weed grass such as crabgrass appears, growth of crabgrass is controlled with 2 to 16 pounds of active ingredient per acre. There is no injury to established Kentucky bluegrass, bentgrass, creeping red fescue or common Bermuda grass growing from rhizomes. The crabgrass emerges and then fails to develop.

As an application on lawn areas, before, during or after seeding the lawn grasses and before the lawn grasses and crabgrass have emerged, 2 to 8 pounds of active ingredient per acre prevents the development of crabgrass. There is no undesirable effect on the development of Kentucky bluegrass, bentgrass or creeping red fescue.

As a directed post-emergence application on crop lands at any time from the moment the weeds emerge to the three leaf stage, 2 to 8 pounds per acre of active ingredient will prevent the further development of the weed grass. There is no perceptible injury to crop plants such as cucumbers, cotton, potatoes, flax, squash, lima beans, eggplant, red clover, tomatoes, lespedeza, peppers, soybeans, red beets, alfalfa, sugar beets, green beans, carrots, peanuts, okra, corn and the like.

As an application on newly seeded lawns after the lawn grasses and weed grass such as crabgrass have appeared, 2 to 8 pounds of active ingredients will prevent the further development of crabgrass. There is no perceptible injury to Kentucky bluegrass, bentgrass or creeping red fescue.

As an application on established lawns after the crabgrass emerges to the 3 leaf stage, 3 to 16 pounds per acre of active ingredient will prevent the further development of crabgrass without injury to the established lawn grasses.

The compounds of this invention can also be applied directly to the soil as pre-emergence or as post-emergence treatments to the locus of growing cheat. Rates of application can be in the range of ½ to 8 pounds per acre and will preferably be used at the rate of 1 to 6 pounds per acre.

More specifically, as a pre-emergence application on wheat lands, 1 to 3 pounds per acre of a compound used in this invention will retard the growth of cheat. There is a good safety margin to wheat.

A number of methods can be used to attach the cycloalkylphenylureas to the surface of desirable seed such as lawn grass seeds. For example, one can take a dust or a powder containing a cycloalkylphenylurea in finely divided form and tumble it with the seed in order to distribute it throughout the seed volume and then unite the cycloalkylphenylurea with the surface of the seed by spraying a sticker into the mixture. Similarly, aqueous slurries containing a cycloalkylphenylurea can be sprayed on the seed while the seed is being tumbled. The sticker can be applied simultaneously in solution in the aqueous slurry or it can be sprayed on separately. It is also sometimes desirable to apply the cycloalkylphenylurea by spraying on seeds emulsifiable solutions either directly or in water emulsions and in this case the oil solvent can also act as a sticker.

The amount of cycloalkylphenylurea mixed with the seed will be sufficient to apply 2 to 24 pounds of the cycloalkylphenylurea per acre. Therefore, compositions must contain from 1 to 55 pounds of cycloalkylphenylurea per 174 pounds of grass seed. It is preferred that the composition contain 2.5 to 15 pounds of cycloalkylphenylurea per 174 pounds of seed.

The compounds of this invention can also be applied admixed with other chemicals which are used in agronomic and horticultural management and are compatible with the compounds of this invention. Such chemicals may be, but are not restricted to, the classes of chemicals commonly known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro-1,4,5,8-dimethanonaphthalene (Dieldrin), 1–2 pounds per acre 1,2,4,5,6,7,8,8-octachloro-4,7-methano-3a,4,7,7a-tetrahydroindane (Chlordane), 2.5–10 pounds per acre 1,1,1-trichloro-2,2-bis(p-methoxyphenyl)ethane (Methoxychlor), 2–4 pounds per acre 1,1,1-trichloro-2,2-bis(p-chlorophenyl)ethane (DDT), 10–20 pounds per acre and 1-naphthyl-N-methylcarbamate ("Sevin") 2–4 pounds per acre.

Insecticides in compositions of this invention are present at the rate of 0.1 to 10 parts by weight for each one part by weight of cycloalkylphenylurea.

Fungicides that can be used in conjunction with the compounds of this invention include:

Metal salts of ethylene bisdithiocarbamic acid, e.g. sodium, manganese, zinc and iron salts; N-trichloromethylmercapto-4-cyclohexene-1,2-dicarboximide;
Phenylmercury acetate;
Inorganic mercury salts;
Methylmercury dihydroxypropyl mercaptide;
Methylmercury acetate;
N-trichloromethylthiophthalimide;
2,3-dichloro-1,4-naphthoquinone;
2,3,5,6-tetrachloro-1,4-benzoquinone;
2,4-dichloro-6-(o-chloroanilino)-s-triazine;
Copper A;
Metal salts of alkyl and dialkyl dithiocarbamic acid, e.g. Zn, Na, K, Fe, Mn, Ni;
Zinc pyridinethione;
S-(1-oxido-2-pyridyl)-isothiuronium chloride;
Tetrachloroisophthalonitrile;
Tetramethylthiuram disulfide;
Hydroxymercurichlorophenol and mixtures of these last two, and methyl mercury dicyandiamide.

When present in compositions of this invention the above-described fungicides will be present at the rate of .02 to 10 parts by weight based on the weight of the cycloalkylphenylurea present in the composition.

The control of weed grasses with cycloalkylphenylurea often can be advantageously accomplished together with the use of conventional herbicides in situations where crabgrass is growing with weeds controlled by the second herbicide.

Illustrative of herbicides that can be used in conjunction with the compounds of this invention in sprays and granular formulations to take weeds out of desirable plants are the following:

| Lbs./Acre | Herbicide | Desirable Plants |
| --- | --- | --- |
| 1–3 | 2,4-dichlorophenoxyacetic acid | Sugar cane and roadside and lawn turf grasses. |
| 0.3–1 | 2,4,5-trichlorophenoxy-acetic acid | Roadside and lawn turf grasses. |
| 0.5–1.5 | 2,4,5,-trichlorophenoxy-propionic acid | Do. |
| 2–4 | 3-amino-2,5-dichlorobenzoic acid | Soybeans. |
| 1–4 | 2,4-bis(isopropylamino)-6-methylmercapto-s-triazine. | Soybeans, cotton and sugar cane. |
| 1–4 | 1-n-butyl-3-(3,4-dichlorophenyl)-1-methylurea. | Ornamentals and lawn turf grasses |
| 1–3 | 2-chloro-4,6-bis(ethyl-amino)-s-triazine | Ornamentals. |
| 1–4 | 2-chloro-4-ethylamino-6-isopropylamino-s-triazine. | Sugar cane and pineapples. |
| 1–4 | 3-(p-chlorophenyl)-1,1-dimethylurea | Do. |
| 0.5–2 | 4-(2,4-dichlorophenoxy)-butyric acid | Alfalfa and other legumes. |
| 0.5–2 | 2-methyl-4-chlorophenoxy-butyric acid | Do. |
| 1–4 | 3-(3,4-dichlorophenyl)-1,1-dimethylurea | Sugar cane, pineapple, grass seed crops and alfalfa. |
| 1–4 | N-(3,4-dichlorophenyl)-methacrylamide | Cotton. |
| 1–4 | 3-(3,4-dichlorophenyl)-1-methoxy-1-methylurea. | Soybeans. |
| 1–4 | 1,2-dihydropyridazine-3,6-dione | Roadside turf grasses. |
| 1–4 | 2-ethylamino-4-isopropyl-amino-6-methylmercapto-s-triazine. | Sugar cane. |
| 2–4 | N,N-diamethyl-α,α-diphenyl-acetamide | Tobacco and tomatoes. |
| 1–3 | Sodium 2,4-dichlorophenoxy-ethyl-sulfate. | Soybeans. |
| 1–3 | Octyl dodecyl ammonium salts of methyl arsonate. | Turf. |
| 1–3 | Disodium methylarsonate | Turf and cotton. |
| 1–5 | Dimethyl ester of tetrachloro terephthalic acid. | Turf. |

The amount of second herbicide set forth in the left column is in addition to the heretofore indicated dosage of cycloalkylphenylurea.

The above may be in the form of salts or non-volatile ester formulations. Also contact herbicides may be included, such as cacodylic acid, potassium cyanate, dinitrosec.-butyl phenyl, 1,1′-ethylene-2,2′-dipyridylium dibromide (diquat) and 1,1′-dimethyl-4,4′-bipyridylium dichloride (paraquat).

Fertilizers commonly called plant nutrients can also be applied together with the compounds used in this invention. The plant nutrients include the commonly used compounds of nitrogen, phosphorus, and potassium; i.e. ammonium sulfate, ammonium nitrate, urea, methylene ureas, low molecular weight urea-formaldehyde polymers, sodium nitrate, anhydrous ammonia, aqueous ammoniacal solutions of urea, or ammonium nitrate, aqueous solutions of urea, or ammonium nitrate, ammonium phosphates, superphosphates, triple superphosphates and phosphoric acid and the potassium salts such as the chloride, sulfate and nitrate. The plant nutrients are applied individually or in admixture with each other as so-called "complete mixtures" of N-P-K which may also contain one or more of the "trace element" plant nutrients; i.e., manganese, zinc, iron, boron, magnesium, etc.

The cycloalkylphenylureas are preferably added to such fertilizer mixtures or compounds following the usual mixing, granulation, ammoniation, drying or other manufacturing operations to avoid possible adverse effects of such operations on the efficacy of the compounds as weed grass retardants.

It is understood that the compounds and compositions of this invention are applied to the "locus" of the grass growth. By "locus" is meant the plant itself when visible above the ground and when the plant is not visible the immediate area of soil where the grass plant is developing.

The following additional examples, in which all percents unless otherwise specified are by weight, are provided so as to more clearly explain this invention.

*Example 1*

A solution of 25.4 parts by weight of cyclooctylamine in 200 parts of toluene is treated over an 18-minute period with 238 parts by weight of phenylisocyanate dissolved in 50 ml. of toluene. The temperature increases from 22 to 47° C. The clear yellow solution is stirred for 1½ hours. The solution is poured into an equal volume of n-pentane. The solid is filtered and washed with n-pentane. There is obtained 40.5 parts by weight of essentially pure 1-cyclooctyl-3-phenylurea, M.P. 154–155° C.

TABLE I

By the above procedure using the following amines the corresponding phenylureas are obtained.

| Amine: | Urea |
|---|---|
| Chlorocyclooctylamine | 1-chlorocyclooctyl-3-phenylurea. |
| Dibromocyclooctylamine | 1-dibromocyclooctyl-3-phenylurea. |
| Methylcyclooctylamine | 1-methylcyclooctyl-3-phenylurea. |
| Dimethylcyclooctylamine | 1-dimethylcyclooctyl-3-phenylurea. |
| Fluorocyclooctylamine | 1-fluorocyclooctyl-3-phenylurea. |
| Dichlorocyclooctylamine | 1-dichlorocyclooctyl-3-phenylurea. |

*Example 2*

A solution of 17 parts by weight of cycloheptylamine in 150 parts of toluene is treated with 18.9 parts by weight of phenylisocyanate in 25 parts of toluene over a 22 minute period. The temperature increases from 22 to 55° C. The mixture is stirred for one hour and the solid collected by filtration. After washing with n-pentane there is obtained 32.5 parts by weight of 1-cycloheptyl-3-phenylurea, M.P. 187.5–188.5° C.

*Analysis.*—Calc'd. for $C_{14}H_{20}N_{20}$: N, 12.1%. Found: N, 12.3%.

TABLE II

By the above procedure using the following amines the corresponding phenylurea are obtained:

| Amine: | Urea |
|---|---|
| Chlorocycloheptylamine | 1-chlorocycloheptyl-3-phenylurea. |
| Dichlorocycloheptylamine | 1-dichlorocycloheptyl-3-phenylurea. |
| Bromocycloheptylamine | 1-bromocycloheptyl-3-phenylurea. |
| Methylcycloheptylamine | 1-methylcycloheptyl-3-phenylurea. |

*Example 3*

A solution of 2-methylcyclohexylamine (cis-trans-mixture) (22.6 parts by weight) in 200 parts of toluene is treated with 23.8 parts by weight of phenylisocyanate over 44 minutes. The temperature increases from 23 to 41° C. After stirring for two hours the solution is evaporated in vacuum on a steam bath. The residue crystallizes on cooling. After washing with n-pentane, the product melts at 120–122° C. It is a mixture of cis and trans 1-(2-methylcyclohexyl)-3-phenylurea.

*Analysis.*—Calc'd. for $C_{14}H_{20}N_{20}$: N, 12.1%; Found: N, 12.0%.

TABLE III

By the above procedure using the following amines the corresponding phenylureas are obtained:

| Amine: | Urea |
|---|---|
| 2-bromocyclohexylamine | 1-(2-bromocyclohexyl)-3-phenylurea. |
| 3-bromocyclohexylamine | 1-(3-bromocyclohexyl)-3-phenylurea. |
| Dichlorocyclohexylamine | 1-dichlorocyclohexyl-3-phenylurea. |
| 2-iodocyclohexylamine | 1-(2-iodocyclohexyl)-3-phenylurea. |

*Example 3a*

A suspension of 1-(2-hydroxycyclohexyl)-3-phenylurea [prepared from 2-aminocyclohexanol, as described in J. Chem. Soc. 1272 (1935)], 23.4 parts by weight in 200 parts of benzene is treated with 13.1 parts by weight of thionylchloride at 25 to 33° C. The solid dissolves and hydrogen chloride evolves. After stirring for three hours the solvent is removed by evaporation in vacuum. The residue is dissolved in hot ethanol, treated with carbon black, and filtered. The crude product separates on cooling. This is then recrystallized from acetonitrile to yield 1-(2-chlorocyclohexyl)-3-phenylurea, M.P. 150–154° C.

*Analysis.*—Calc'd. for $C_{13}H_{17}ClN_2O$: N, 11.1%; Cl, 14.0%. Found: N, 11.2%; Cl, 14.0%.

*Example 4*

A solution of 17 parts by weight of cyclopentylamine in 150 parts of toluene is treated with 23.8 parts by weight of phenylisocyanate over 20 minutes. The temperature increases from 24 to 70° C. Stir for one hour after the addition and filter off the solids. After washing with n-pentane and drying, there is obtained 38.7 parts by weight of 1-cyclopentyl-3-phenylurea, M.P. 207.5–208.5° C.

*Analysis.*—Calc'd. for $C_{12}H_{16}N_{20}$: N, 13.7%. Found: N, 13.7%.

TABLE IV

By the above procedure using the following amines the phenylureas can be prepared:

| Amine: | Urea |
|---|---|
| 2-methylcyclopentylamine | 1-(2-methylcyclopentyl)-3-phenylurea. |
| Chlorocyclopentylamine | 1-chlorocyclopentyl-3-phenylurea. |
| Dichlorocyclopentylamine | 1-dichlorocyclopentyl-3-phenylurea. |
| Bromocyclopentylamine | 1-bromocyclopentyl-3-phenylurea. |

Example 5

A suspension of 13.2 parts by weight of 2-norbornylamine hydrochloride in 150 ml. of toluene is treated with 10 parts by weight of triethylamine. The triethylamine hydrochloride is filtered from the mixture and the filtrate is treated with 10.7 parts by weight of phenylisocyanate. After stirring for 2 hours the solid is filtered from the reaction mixture. There is obtained 4.3 parts by weight of 1-(2-norbornyl)-3-phenylurea, M.P. 195–215° C. (mixture of endo and exo isomers).

Analysis.—Calc'd. for $C_{14}H_{18}N_2O$: N, 12.1%. Found: N, 12.1%.

TABLE V

By the above procedure using the following amines the corresponding phenylureas are obtained:

| Amine: | Urea |
|---|---|
| Endo - 2 - norbornylamine | Endo - 1 - (2-norbornyl)-3-phenylurea. |
| Exo - 2 - norbornylamine | Exo - 1 - (2-norbornyl)-3-phenylurea. |
| 3-methyl - 2 - norbornylamine | 1-(3-methyl - 2 - norbornyl)-3-phenylurea. |
| 1,7-dimethyl - 2 - norbornylamine | 1-(1,7-dimethyl - 2 - norbornyl)-3-phenylurea. |
| 2 - ethylcyclopentylamine | 1-(2 - ethylcyclopentyl)-3-phenylurea (cis - trans mixture). |
| 3,3-dimethyl - 2 - norbornylamine | 1-(3,3 - dimethyl-2-norbornyl)-3-phenylurea. |
| 5,5-dimethyl - 2 - norbornylamine | 1-(5,5 - dimethyl-2-norbornyl)-3-phenylurea. |
| Chloronorbornylamine | 1 - chloronorbornyl-3-phenylurea. |
| Dichloronorbornylamine | 1 - dichloronorbornyl - 3-phenylurea. |

Example 6

A solution of 19.8 parts by weight of cyclohexylamine in 150 parts of toluene is treated with 26.6 parts by weight of m-tolylisocyanate in 25 parts of toluene. The addition requires 7 minutes and the temperature increase increases from 22–52° C. After stirring for ½ hour the product is filtered and washed with n-pentane. Essentially pure 1-cyclohexyl-3-m-tolylurea is obtained which melts at 150–152° C. (41.4 parts by weight).

Analysis.—Calc'd. for $C_{14}H_{20}N_2O$: N, 12.1%. Found: N, 12.1%.

Example 7

A solution of 12.4 parts by weight of cyclooctylamine in 100 parts of toluene is reacted with 13 parts of m-tolyl isocyanate in 25 parts of toluene. Addition time is 8 minutes. The reaction is very exothermic and ice bath cooling is required to keep the temperature below 40° C. After stirring for ½ hour the reaction mixture is filtered and the product washed with n-pentane and dried. There is obtained 21.5 parts of 1-cyclooctyl-3-m-tolylurea, M.P. 87–89° C.

Analysis.—Calc'd. for $C_{16}H_{24}N_2O$: N, 10.7%. Found: N, 10.5%.

TABLE VI

Using the procedure described in Examples 6 and 7 the following m-tolylureas can be prepared:

| Amine: | Product |
|---|---|
| Cyclopentylamine | 1-cyclopentyl - 3 - m-tolylurea. |
| 2 - methylcyclohexylamine | 1-(2 - methylcyclohexyl)-3-m-tolylurea M.P. 147.5–150° C. |
| 3 - methylcyclohexylamine | 1-(3 - methylcyclohexyl)-3-m - tolylurea M.P. 165–167.5° C. |
| Cycloheptylamine | 1-cycloheptyl - 3 - m-tolylurea M.P. 145–147° C. |
| 1 - (2 - chlorocyclohexyl)-amine | 1-(2 - chlorocyclohexyl)-3-m-tolylurea. |

Example 8

The following granular formulation can be used for most solid cycloalkylphenylureas of this invention melting above 90° C. A wettable powder is first prepared by micro-pulverizing the following ingredients:

| | Percent |
|---|---|
| 1-cyclooctyl-3-phenylurea | 50 |
| Attapulgite clay | 48 |
| Dioctyl sodium sulfosuccinate | 1 |
| Sodium lignin sulfonate | 1 |

The wettable powder is distributed over the surface of #4 vermiculite by tumbling together. To make the combination more adherent the mix is sprayed with a mixture of ethylene glycol and water. The final ratio of ingredients is as follows:

| | Percent |
|---|---|
| 50% active wettable powder | 4 |
| #4 vermiculite | 86 |
| Ethylene glycol | 5 |
| Water | 5 |

In a modification of the above formulation the ethylene glycol may be replaced by a mixture of the sodium sulfates of mixed long chain alcohol fatty acid esters and diethylene glycol acetate in a ratio between 1:10 and 10:1 by weight.

The granular formulation described above has utility as a pre-emergence treatment for controlling crabgrass in an established Kentucky bluegrass-creeping red fescue lawn. The material is applied with a granule spreader at the rate of 8 pounds of active ingredient per acre prior to the germination of crabgrass. Such excellent retardation of crabgrass is obtained that it presents no competition to the established lawn. Some retardation of the established lawn species without injury is noted.

This formulation is used also for the retardation of crabgrass in crops belonging to the Cruciferae family. A pre-emergency application of 2 to 3 pounds of active ingredient per acre essentially stops the growth of crabgrass shortly after it emerges from the soil. A planting of mustard shows no injurious effects from the treatment.

Examples 9–11

The following compounds are substituted one at a time for the 1-cyclooctyl-3-phenylurea in Example 8 in like amount by weight and are formulated and applied in like manner. Like results are obtained.

Example:
- 9 _____ 1-cyclooctyl-3-m-tolylurea.
- 10 _____ 1-(3-methylcyclohexyl)-3-m-tolylurea.
- 11 _____ 1-(4-methylcyclohexyl)-3-phenylurea.

Example 12

The following wettable powder is suitable for any of the compounds described above which melt above 90° C.:

| | Percent |
|---|---|
| 1-cyclohexyl-3-phenylurea | 50 |
| Diatomaceous silica | 48 |
| Coconut acid ester of sodium isothionate | 1 |
| Sodium lauryl sulfate | 1 |

The ingredients are blended and micropulverized to pass a 60 mesh screen.

This wettable powder formulation in the amount of 4 pounds of active ingredient is added to 80 gallons of water in a spray tank. A surfactant such as trimethylnonyl polyethylene glycol ether is added to this mixture at the rate of 6 pounds. This tank spray mixture is applied to one acre of established common Bermuda grass lawn which is infested with crabgrass in the 1 to 2 leaf stage. Excellent retardation of crabgrass is obtained. It turns dark green, shows very slow growth and the root system fails to develop normally. The crabgrass offers poor competition and is crowded out by the common Bermuda grass. The common Bermuda grass shows a reduced rate of growth without injury.

Examples 13–14

The following compounds are substituted one at a time for the 1-cyclohexyl-3-phenylurea of Example 12 in like amount by weight and are formulated and applied in like manner. Like results are obtained.

Example:
- 13 _____ 1-m-tolyl-3-cycloheptylurea.
- 14 _____ 1-(1-methylcyclopentyl)-3-phenylurea.

Example 15

A formulation example for 1-(2-methylcyclohexyl)-3-phenylurea follows:

| | Percent |
|---|---|
| 1-(2-methylcyclohexyl)-3-phenylurea | 25.00 |
| Hydrated attapulgite clay | 1.75 |
| Na$_2$HPO$_4$ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which may be diluted with water for spray application.

This liquid dispersion is applied at the rate of 2 to 4 pounds of active ingredient per acre in 40 gallons of water for the control of crabgrass growth in a planting of arborvitae and privet. Crabgrass treated in the 1–3 leaf stage in retarded markedly. Crabgrass seeds in the soil germinate but fail to grow.

This formulation has utility for the regulation of crabgrass growth in an established Kentucky 31 fescue lawn. A rate of 6 to 8 pounds of active ingredient per acre gives excellent retardation of crabgrass when treated in the 2 leaf stage.

Examples 16–38

The following compounds are substituted one at a time for the 1-(2-methylcyclohexyl)-3-phenylurea in Example 15 in like amount by weight and are formulated and applied in like manner. Like results are obtained.

Example:
- 16 ____ 1-(2-methylcyclohexyl)-3-m-tolylurea.
- 17 ____ 1-(2-chlorocyclohexyl)-3-m-tolylurea.
- 18 ____ 1-(2-chlorocyclohexyl)-3-phenylurea.
- 19 ____ 1-(2-bromocyclohexyl)-3-phenylurea.
- 20 ____ 1-(2-chlorocyclooctyl)-3-phenylurea.
- 21 ____ 1-dibromocyclooctyl-3-phenylurea.
- 22 ____ 1-methylcyclooctyl-3-phenylurea.
- 23 ____ 1-(2,5-dimethylcyclooctyl)-3-phenylurea.
- 24 ____ 1-(2-fluorocyclooctyl)-3-phenylurea.
- 25 ____ 1-dichlorocyclooctyl-3-phenylurea.
- 26 ____ 1-(2-chlorocycloheptyl)-3-phenylurea.
- 27 ____ 1-dichlorocycloheptyl-3-phenylurea.
- 28 ____ 1-(2-bromocycloheptyl)-3-phenylurea.
- 29 ____ 1-(2-methylcycloheptyl)-3-phenylurea.
- 30 ____ 1-cyclohexyl-3-phenylurea.
- 31 ____ 1-[2(cis),4(trans)-dimethylcyclohexyl]-3-phenylurea.
- 32 ____ 1-[2(trans),4(cis)-dimethylcyclohexyl]-3-phenylurea.
- 33 ____ 1-cis(2-methylcyclohexyl)-3-phenylurea.
- 34 ____ 1-trans(2-methylcyclohexyl)-3-phenylurea.
- 35 ____ 1-cis(3-methylcyclohexyl)-3-phenylurea.
- 36 ____ 1-trans(3-methylcyclohexyl)-3-phenylurea.
- 37 ____ 1-cis(4-methylcyclohexyl)-3-phenylurea.
- 38 ____ 1-trans(4-methylcyclohexyl)-3-phenylurea.

Example 39

The following wettable powder can be diluted with water or it may be made up as a tank mix in conjunction with 0.2–5 parts of trimethylnonyl polyethylene glycol ether per part of active ingredient:

| | Percent |
|---|---|
| 1-cycloheptyl-3-phenylurea | 70.0 |
| Attapulgite clay | 18.0 |
| Dioctyl sodium sulfosuccinate | 2.5 |
| Na$_2$HPO$_4$ | 2.5 |
| Partially desulfonated sodium lignin sulfonate | 2.0 |
| Synthetic fine silica | 5.0 |

This wettable powder formulation is applied at the rate of 4 pounds active ingredient in conjunction with 4 pounds of surfactant in 40 gallons of water as a directed post-emergence spray to crabgrass in the 1 to 3 leaf stage in a field of cotton when the cotton is 6 inches high. Excellent control of the crabgrass is obtained. Late germinating seedlings are retarded severely. Upon examination of the weeds, a severe retardation of the root system is noted. The cotton shows normal growth.

Example 40

The following compound is substituted for the 1-cycloheptyl-3-phenylurea in Example 39 in like amount by weight and is formulated and applied in like manner. Like results are obtained.

1-(3-methylcyclohexyl)-3-phenylurea

Example 41

The following emulsifiable oil can be extended with either oil or water:

| | Percent |
|---|---|
| 1-cyclooctyl-3-phenylurea | 20 |
| A blend of polyoxyethylene ethers and oil soluble sulfonates | 5 |
| Alkylated naphthalene (principally α-methylnaphthalene) | 75 |

The above components are blended and agitated until a homogeneous mixture is obtained.

This emulsifiable formulation is extended with 80 gallons of herbicidal oil and applied at the rate of 12 pounds active ingredient per acre to an area infested with crabgrass. Excellent growth regulation of crabgrass is obtained. Weed seeds germinating after treatment show severe retardation.

A pre-emergence application of the above formulation at the rate of 2 to 4 pounds of active ingredient per acre in 40 gallons of water gives excellent retardation of crabgrass in a newly planted field of soybeans.

Examples 42–51

The following compounds are substituted one at a time for the 1-cyclooctyl-3-phenylurea in Example 41 in like amount by weight and are formulated and applied in like manner. Like results are obtained.

Example:
- 42 ---- 1-norbornyl-3-phenylurea.
- 43 ---- 1-norbornyl-3-m-tolylurea.
- 44 ---- Endo-1-(2-norbornyl)-3-phenylurea.
- 45 ---- Exo-1-(2-norbornyl)-3-phenylurea.
- 46 ---- 1-(3-methyl-2-norbornyl)-3-phenylurea.
- 47 ---- 1-(1,7-dimethyl-2-norbornyl)-3-phenylurea.
- 48 ---- 1-(3,3-dimethyl-2-norbornyl)-3-phenylurea.
- 49 ---- 1-(5,5-dimethyl-2-norbornyl)-3-phenylurea.
- 50 ---- 1-chloronorbornyl-3-phenylurea.
- 51 ---- 1-dichloronorbornyl-3-phenylurea.

Example 52

The following wettable powder is applicable to the low melting solids described in the examples as well as all the high melting solid compounds of this invention.

| | Percent |
|---|---|
| 1-cyclopentyl-3-phenylurea | 25.00 |
| Alkyl naphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied preemergence at the rate of 4–8 pounds of active ingredient per acre in 100 gallons of water for the control of growth of crabgrass in an established bluegrass-fescue lawn. Excellent control of crabgrass is obtained without noticeable damage to the desirable turf grasses.

Example 53

| | Percent |
|---|---|
| 1-(3-methylcyclohexyl)-3-phenylurea | 80 |
| Calcium lignin sulfonate | 2 |
| Alkyl naphthalene sulfonic acid, Na salt | 2 |
| $CaSO_4 \cdot 2H_2O$ | 1 |
| Tricalcium phosphate | 7 |
| Attapulgite clay | 8 |

The ingredients are mixed and micropulverized to a particle size essentially below 50 microns and then reblended.

The above formulation is applied at a rate of 4 pounds of active ingredient in 60 gallons of water for the control of growth of crabgrasses which are ½ to 1 inch tall along a roadside. This application gives outstanding control of crabgrass. Germinating seedlings are retarded markedly.

Examples 54–57

The following compounds are substituted one at a time for the 1-(3-methylcyclohexyl)-3-phenylurea in Example 53 in like amount by weight and are formulated and applied in like manner. Like results are obtained.

Example:
- 54 ------ 1-(2-methylcyclopentyl)-3-phenylurea.
- 55 ------ 1-chlorocyclopentyl-3-phenylurea.
- 56 ------ 1-dichlorocyclopentyl-3-phenylurea.
- 57 ------ 1-bromocyclopentyl-3-phenylurea.

Example 58

*Granular formulation.*—The following granular formulation has general application to the cycloalkylphenylureas used in this invention.

| | Percent |
|---|---|
| 1-(2-methylcyclohexyl)-3-phenylurea | 2 |
| 15–30 mesh attaclay granules | 98 |

The active material can be applied to the attaclay granules in several ways. (1) The active material may be dissolved in a volatile solvent such as acetone and sprayed on the tumbling granules, or (2) wettable powder containing the active material may be distributed on the surface of the granules. By moistening with water or a mixture of water and ethylene glycol dusting off is prevented. In other granular formulations, if the melting point of the active ingredient is below about 99° C., the active ingredient can be melted and sprayed over a tumbling mass of preferred clay-, vermiculite-, or similar granules.

This granular formulation is applied pre-emergence with a granule spreader at the rate of 2–6 pounds of active ingredient per acre for the control of growth of crabgrass in an established bluegrass-meadow fescue lawn. The crabgrass emerges from the soil but fails to grow normally. The established lawn grasses shown slight retardation with no objectionable injury.

Examples 59–131

The following compounds are substituted one at a time for the 1-(2-methylcyclohexyl)-3-phenylurea in Example 58 in like amount by weight and are formulated and applied in like manner. Like results are obtained.

Example:
- 59 ------ 1-cyclopentyl-3-m-tolylurea.
- 60 ------ 1-(3-methylcyclohexyl)-3-m-tolylurea.
- 61 ------ 1-(2-methylcyclohexyl)-3-m-tolylurea.
- 62 ------ 1-cycloheptyl-3-m-tolylurea
- 63 ------ 1-(2-chlorocyclohexyl)-3-m-tolylurea.
- 64 ------ 1-(2-bromocyclooctyl)-3-phenylurea.
- 65 ------ 1-(2-idocyclooctyl)-3-phenylurea.
- 66 ------ 1-(2-bromocyclohexyl)-3-phenylurea.
- 67 ------ 1-dichlorocyclohexyl-3-phenylurea.
- 68 ------ 1-dibromocyclohexyl-3-phenylurea.
- 69 ------ 1-(2-iodocyclohexyl)-3-phenylurea.
- 70 ------ 1-(2-fluorocyclohexyl)-3-phenylurea.
- 71 ------ 1-(1-methylcyclohexyl)-3-phenylurea.
- 72 ------ 1-(2-fluorocyclophentyl)-3-phenylurea.
- 73 ------ 1-(3-iodocyclopentyl)-3-phenylurea.
- 74 ------ 1-(5-chloro-2-norbornyl)-3-phenylurea.
- 75 ------ 1-(5,6-dichloro-2-norbornyl) - 3 - phenylurea.
- 76 ------ 1-(bromo-2-norbornyl)-3-phenylurea.
- 77 ------ 1-(iodo-2-norbornyl)-3-phenylurea.
- 78 ------ 1-(chloro-2-methylcyclohexyl) - 3-phenyurea.
- 79 ------ 1-(chloro-3-methyl - 2 - norbornyl) - 3 - phenylurea.
- 80 ------ 1-cyclohexyl-3-m-tolylurea.
- 81 ------ 1-(2-norbornyl)-3-phenylurea.
- 82 ------ 1-(3-methyl-2-norbornyl)-3-phenylurea.
- 83 ------ 1-(4-methylcyclohexyl)-3-m-tolylurea.
- 84 ------ 1-cyclohexyl-3-o-tolylurea.
- 85 ------ 1-(1,7-dimethyl-2-norbornyl) - 3 - phenylurea.
- 86 ------ 1-(2-methylcyclohexylmethyl) - 3 - phenylurea.
- 87 ------ 1-cyclooctylmethyl-3-phenylurea.
- 88 ------ 1-chlorocyclopentylmethyl-3-m-tolylurea.
- 89 ------ 1-(2-ethylcyclohexylmethyl) - 3 - p - tolylurea.
- 90 ------ 1-cyclohexylmethyl-3-o-tolylurea.
- 91 ------ 1-cyclohexylmethyl-3-m-tolylurea.
- 92 ------ 1-chlorocyclohexylmethyl-3-phenylurea.
- 93 ------ 1-(3-fluoronorbornyl)-3-phenylurea.
- 94 ------ 1-chlorocyclohexyl-3-p-tolylurea.
- 95 ------ 1-(3-methylcyclohexyl)-3-o-tolylurea.
- 96 ------ 1-(2-methylcyclohexylmethyl) - 3 - o - tolylurea.
- 97 ------ 1-(2-methylcyclohexylmethyl)-3-p-tolylurea.
- 98 ------ 1-(2,4-dimethylcyclohexylmethyl) - 3 - m-tolylurea.
- 99 ------ 1-(2,5 - dimethylcyclohexylmethyl) - 3 - phenylurea.
- 100 ----- 1-(3,4 - dimethylcyclohexylmethyl) - 3 - phenylurea.

Example:
101 ----- 1-(2-methyl-4-chlorocyclohexyl) - 3 - o - tolylurea.
102 ----- 1-(3,4-dichlorocyclohexyl)-3-phenylurea.
103 ----- 1-(2-methylcyclohexyl)-3-p-tolylurea.
104 ----- 1-(2-methylcyclohexyl)-3-o-tolylurea.
105 ----- 1-(3-iodonorbornyl)-3-phenylurea.
106 ----- 1-(4-methylcyclohexylmethyl)-3-phenylurea.
107 ----- 1-(2-chlorocyclohexylmethyl) - 3 - phenylurea.
108 ----- 1-(5,6 - dichloronorbornylmethyl) - 3 - phenylurea.
109 ----- 1-chloronorbornylmethyl-3-phenylurea.
110 ----- 1-cyclopentylmethyl-3-phenylurea.
111 ----- 1-cycloheptylmethyl-3-phenylurea.
112 ----- 1-(2-ethylcyclohexyl)-3-phenylurea.
113 ----- 1-(3-ethylcyclohexyl)-3-phenylurea.
114 ----- 1-(2-ethylcyclohexyl)-3-m-tolylurea.
115 ----- 1-(2-chloro - 4 - methylcyclohexyl) - 3 phenylurea.
116 ----- 1-(3,5-dimethylcyclohexyl) - 3 - phenylurea.
117 ----- 1-(2,4 - dimethylcyclohexyl) - 3 - p - tolylurea.
118 ----- 1-(1-methylcyclohexyl)-3-m-tolylurea.
119 ----- 1-(2 - bromocyclooctylmethyl) - 3 - m - tolylurea.
120 ----- 1-(2 - fluorocyclopentylmethyl) - 3 - m - tolylurea.
121 ----- 1-(2 - iodocycloheptylmethyl) - 3 - m - tolylurea.
122 ----- 1-cyclohexylmethyl-3-o-tolylurea.
123 ----- 1-(2,4-dimethylcyclohexyl)-3-o-tolylurea.
124 ----- 1-(2 - bromocyclohexylmethyl) - 3 - p - tolylurea.
125 ----- 1-(o - fluorophenyl) - 3 - (2 - methylcyclohexyl)urea.
126 ----- 1-(o-fluorophenyl)-3-cyclohexylurea.
127 ----- 1-(o-fluorophenyl)-3-cycloheptylurea.
128 ----- 1-(o-fluorophenyl)-3-norbornylurea.
129 ----- 1-(o - fluorophenyl) - 3 - cyclohexylmethylurea.
130 ----- 1-(o - fluorophenyl) - 3 - (2 - fluorocyclohexyl)urea.
131 ----- 1-(o - fluorophenyl) - 3 - (4 - chlorocyclohexyl)urea.

*Example 132*

*Pellet formulation.*—The following pellet formulation is applicable to any cycloalkylphenylurea used in this invention.

| | Percent |
|---|---|
| 1-(4-chlorocyclohexyl)-3-phenylurea | 11 |
| Anhydrous sodium sulfate | 10 |
| Mississippi sub-bentonite | 33 |
| Kaolin clay | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of ⁵⁄₃₂ inch. The extruded strands are conveniently cut into small pellets as they come out of the extruder die. The pellets are air dried. After drying the pellets can be easily handled and applied as such. However, they readily soften and disintegrate when mildly agitated in water and can also be applied in water rather than as the pellets.

*Examples 133–137*

The following compounds are substituted one at a time for the 1-(4-chlorocyclohexyl)-3-phenylurea in Example 132 in like amount by weight and are formulated and applied in like manner. Like results are obtained.

Example:
133 ---- 1-(2-chlorocyclohexyl)-3-phenylurea.
134 ---- 1-(2-bromocyclohexyl)-3-phenylurea.
135 ---- 1-(3-bromocyclohexyl)-3-phenylurea.
136 ---- 1-dichlorocyclohexyl-3-phenylurea.
137 ---- 1-(2-iodocyclohexyl)-3-phenylurea.

*Example 138*

A dust formulation is prepared from any cycloalkylphenylurea of this invention melting above 90° C. as follows:

| | Percent |
|---|---|
| 1-cyclohexyl-3-phenylurea | 5 |
| Talc | 95 |

The ingredients are mixed and micropulverized to a state of subdivision in which most of the individual particles are below 50 microns in size.

*Example 139*

The following wettable powder formulation is prepared:

| | Percent |
|---|---|
| 1-(2-methylcyclohexyl)-3-phenylurea | 52.6 |
| Pikes Peak clay | 44.4 |
| Sodium dioctyl sulfosuccinate | 1.5 |
| Sodium lignin sulfonate | 1.5 |

The above components are blended and micropulverized until homogeneous, passed through an air attrition mill until the particle size is substantially less than 20 microns and then reblended.

The formulation described above is applied pre-emergence at the rate of 4–8 pounds of active ingredient per acre in 100 gallons of water for the control of crabgrass growth in an established bluegrass-fescue lawn. Excellent retardation of crabgrass is obtained, without noticeable damage to the desirable turf grasses.

This formulation is also used pre-emergence at 8 pounds of active ingredient in 80 gallons of water for growth retardation of crabgrass without injury to a new seeding of creeping red fescue, Kentucky bluegrass and bentgrass.

This formulation is also incorporated to a depth of 3 inches in a sandy loam soil. Sugar beets are planted 2 days later. Excellent control of germinating crabgrass and foxtail is obtained with an application rate of 2 to 4 pounds of active ingredient per acre.

*Example 140*

To 90 ml. of n-hexane, 16.4 grams of trichloroacetic acid is added with stirring. To this mixture is added 21.8 grams of 1-cyclohexyl-3-phenylurea. A grayish oil is separated from the hexane. The remaining traces of hexane are removed by placing the oil under high-vacuum for two hours. There is obtained 25.3 grams of partially crystallized 1-cyclohexyl - 3 - phenylurea, trichloroacetic acid 1/1 addition compound.

The product of the above process is mixed with a quantity of 15–30 mesh attapulgite clay granules so that the resulting formulation contains 2% active and 98% attapulgite clay.

The active material can be applied to the attapulgite granules in several ways. (1) The active material may be dissolved in a volatile solvent such as acetone and sprayed on the tumbling granules, or (2) wettable powder containing the active material may be distributed on the surface of the granules. By moistening with water or a mixture of water and ethylene glycol dusting off is prevented. In other granular formulations, if the melting point of the active ingredient is below about 99° C., the active ingredient can be melted and sprayed over a tumbling mass of preferred clay-, vermiculite-, or similar granules.

This granular formulation is applied pre-emergence with a granule spreader at the rate of 2–3 pounds of active per acre for the control of growth of crabgrass. The crabgrass emerges from the soil but fails to grow.

*Examples 141–160*

The following compounds are made in the manner of Example 140 by substituting the appropriate starting materials, as will be known by an expert in the art, for the 1-cyclo-hexyl-3-phenylurea and trichloroacetic acid.

These compounds are substituted one at a time for the 1-cyclohexyl-3-phenylurea, trichloroacetic acid addition compound in Example 140 in like amount by weight and are formulated and applied at rates of 2 to 6 pounds per acre of active ingredient. Excellent weed control is obtained.

Example:
- 141 ____ 1-(2-methylcyclohexyl)-3-phenylurea 1/1 addition compound with trichloroacetic acid.
- 142 ____ 1-(2-methylcyclohexyl)-3-phenylurea 1/1 addition compound with dodecylbenzene sulfonic acid.
- 143 ____ 1-(2-methylcyclohexyl)-3-phenylurea 1/1 addition compound with phosphoric acid.
- 144 ____ 1-(2-methylcyclohexyl)-3-phenylurea 1/1 addition compound with 2,3,6-trichlorobenzoic acid.
- 145 ____ 1-(2-methylcyclohexyl)-3-phenylurea 1/1 addition compound with phenol.
- 146 ____ 1-(2-methylcyclohexyl)-3-phenylurea 1/1 addition compound with 2,4-dinitro-o-sec-butyl phenol.
- 147 ____ 1-(3-methylcyclohexyl)-3-phenylurea 1/1 addition compound with 2,2-dichloropropionic acid.
- 148 ____ 1-(3-methylcyclohexyl)-3-phenylurea 1/1 addition compound with p-toluene sulfonic acid.
- 149 ____ 1-cyclooctyl-3-phenylurea 1/1 addition compound with trichloroacetic acid.
- 150 ____ 1-cyclopentyl-3-phenylurea 1/1 addition compound with 2,2,3-trichloropropionic acid.
- 151 ____ 1-norbornyl-3-phenylurea 1/1 addition compound with 2,4-dichlorophenoxyacetic acid.
- 152 ____ 1-(4-methylcyclohexyl)-3-m-tolyurea 1/1 addition compound with 2,4,5-trichlorophenoxyacetic acid.
- 153 ____ 1-cycloheptyl-3-phenylurea 1/1 addition compound with 2,4,5-trichlorophenoxypropionic acid.
- 154 ____ 1-cyclopentyl-3-m-tolylurea 1/1 addition compound with phenol.
- 155 ____ 1-(2-methylcyclohexyl)-3-o-tolylurea 1/1 addition compound with pentachlorophenol.
- 156 ____ 1-(2-ethylcyclohexyl)-3-phenylurea 1/1 addition compound with trichloroacetic acid.
- 157 ____ 1-(2-chlorocyclohexyl)-3-phenylurea 1/1 addition compound with trichloroacetic acid.
- 158 ____ 1-(2-ethylcyclohexyl)-3-phenylurea 1/1 addition compound with phenol.
- 159 ____ 1-(2,4-dimethylcyclohexyl)-3-phenylurea 1/1 addition compound with dodecylbenzene sulfonic acid.
- 160 ____ 1-(3,5-dimethylcyclohexyl)-3-phenylurea 1/1 addition compound with dodecylbenzene sulfonic acid.

*Example 161*

| | Pounds |
|---|---|
| 1-(2-methylcyclohexyl)-3-phenylurea | 12 |
| Kentucky bluegrass seed | 174 |
| Water | 9.36 |
| Low viscosity polyvinyl alcohol ("Elvanol" 51–05) | 0.24 |
| Finely divided synthetic silica | 1.00 |
| Polyacrylic resin emulsion "Rhoplex" ® 50% suspension | 2.40 |

The 1-(2-methylcyclohexyl)-3-phenylurea is admixed with the PVA dispersing agent and silica, followed by micro-pulverizing and then dry mixing with the seeds. The "Rhoplex" suspension in water is sprayed on the dry components while they are tumbled in a mixer. Warm air is forced through the mixture to remove moisture added from the slurry. There results a dry coated seed.

This composition is evenly distributed over one acre of prepared seed bed utilizing a fertilizer spreader. A lush growth of bluegrass developes having little or no competition from crabgrass.

*Example 162*

The following wettable powder is prepared by grinding the ingredients until the particle size of the mixture is substantially below 50 microns:

| | Percent |
|---|---|
| 1-(o-fluorophenyl)-3-(2-methylcyclohexyl)urea | 80 |
| Montmorillonite clay | 16 |
| Dioctyl sodium sulfosuccinate | 2 |
| Partially desulfonated sodium lignin sulfonate | 2 |

Five pounds of this powder is dispersed in one gallon of water, and there is added one quart of "Plyac," a polyethylene latex containing approximately 35% solids. This mixture is then applied to 75 pounds of Highland bentgrass seed by tumbling the seed in a cement mixer, spraying in the above slurry and forcing hot air through the bed to remove excess moisture.

*Example 163*

The following composition, prepared by mixing and grinding the ingredients to obtain a fine pulverulent dust, is mixed with grass seed at rates of 18 pounds of composition per 200 pounds of alta fescue.

| | Percent |
|---|---|
| 1-(2-chlorocyclohexyl)-3-phenylurea | 80 |
| Calcium lignin sulfonate | 2 |
| Alkyl napththalene sulfonic acid, sodium salt | 2 |
| $Ca_2SO_4 \cdot H_2O$ | 1 |
| Tricalcium phosphate | 7 |
| Attapulgite clay | 8 |

When a substantially uniform mixture has been obtained the dust is attached to the seed by spraying two quarts of 10% solution of polyvinyl alcohol over the seed surface while tumbling continues to maintain uniformity. The treated seed is then air dried.

*Example 164*

A suspension concentrate as follows is prepared by sand milling the ingredients for 45 minutes with an equal volume of 20–30 mesh Ottawa sand:

| | Percent |
|---|---|
| 1-(2-methylcyclohexyl)-3-phenylurea | 25.00 |
| Hydrated attapulgite clay | 1.75 |
| $Na_2HPO_4$ | 0.80 |
| Sodium pentachlorophenate | 0.60 |
| Sodium lignin sulfonate | 15.00 |
| Water | 56.85 |

The composition is applied to grass seed by spraying the concentrate directly on the seed while the latter is being tumbled. No additional sticker is needed.

Example 165

The composition of Example 163 is applied by tumbling 12.5 pounds of the powder with 90 pounds of Kentucky bluegrass and 80 pounds of Pennlawn fescue. A solution of 6 ounces of "Seed Coat" (a methyl cellulose based seed adhesive) in 6 quarts of water is prepared. This solution is applied to the surface of the tumbling seed in a fine atomized stream to attach the powder to the surface of the seed. The seed is then dried prior to storage.

Example 166

A solution of 824 parts by weight of 2-methylcyclohexylamine (65% trans, 35% cis isomer) is dissolved in 5000 parts of n-hexane. To this is slowly added 868 parts of phenylisocyanate. Solid starts to separate after ⅓ of the isocyanate is added. A slight amount of cooling is needed to keep the temperature below the boiling point. After the addition is completed, the mixture is filtered and the solid is washed with solvent and air dried. There is obtained 1674 parts by weight of essentially pure 1-(2-methylcyclohexyl)-3-phenylurea, M.P. 132.5–134° C.

The 1-(2-methylcyclohexyl)-3-phenylurea prepared as above is formulated into a wettable powder as follows:

| | Percent |
|---|---|
| 1-(2-methylcyclohexyl)-3-phenylurea, tech. | 52.6 |
| Partially desulfonated sodium lignin sulfonate ("Marasperse" CBS) | 1.5 |
| Sodium dioctylsulfosuccinate concreted with benzoic acid ("Aerosol" OT-B) | 2.0 |
| Disodium hydrogen phosphate | 2.5 |
| Synthetic fine silica ("HiSil" 233) | 2.5 |
| Hydrated attapulgite ("Attaclay") | 38.9 |

The above ingredients are mixed and micropulverized to a particle size of less than 50 microns and then reblended.

The above formulation is applied pre-emergence at the rate of 10 pounds of active per acre in 200 gallons water to a newly-seeded spring lawn containing Kentucky bluegrass, creeping red fescue and annual ryegrass. A heavy infestation of crabgrass emerges but fails to develop. The desirable turf grasses emerge and grow normally to form a good lawn cover.

The formulation above is also applied to a rice field immediately after the rice is seeded. The application rate is 1 to 2 pounds of active ingredient. Excellent control is achieved on barnyardgrass and junglerice.

In addition, the 1-(2-methylcyclohexyl)-3-phenylurea wettable powder described above is further formulated into 5% active granules.

| | Percent |
|---|---|
| 1-(2-methylcyclohexy)-3-phenylurea (as a 50% active wettable powder) | 10 |
| #4 vermiculite | 80 |
| Nonylphenol polyethylene glycol ether | 5 |
| Water | 5 |

The wettable powder and the vermiculite are dry blended. The surfactant and water are combined and sprayed on the dry ingredients which are being tumbled in a blender.

This granular formulation is applied in the spring with a lawn spreader at the rate of 10 pounds of active compound per acre for the pre-emergence control of crabgrass in an established bluegrass-redfescue lawn. Prior to application of the growth retardant, bare spots in the lawn, due to previous crabgrass infestations, are reseeded to bluegrass and fescue. The germinating lawn grasses emerge and grow normally. Excellent control of crabgrass is obtained. The crabgrass barely emerges and fails to grow.

Example 167

By the procedure described in Example 166, 606 parts of 3-methylcyclohexylamine (B.P. 87° C./100 mm.) in 6000 parts of n-hexane is treated with 638 parts of phenylisocyanate. Solids start to separate shortly after the addition is started. There is obtained 1230 parts by weight of essentially pure 1-(3-methylcyclohexyl)-3-phenylurea, M.P. 153–154.5° C. (cis-trans mixture).

The 1-(3-methylcyclohexyl)-3-phenylurea prepared as above is formulated into a wettable powder as follows:

| | Percent |
|---|---|
| 1-(3-methylcyclohexyl)-3-phenlyurea | 52.6 |
| Sodium lignin sulfonate | 3.0 |
| Finely divided synthetic silica | 10.0 |
| Attapulgite clay | 28.4 |
| Sodium alkylnaphthalene sulfonate | 6.0 |

The above ingredients are mixed and micropulverized to a particle size essentially below 50 microns and then are reblended.

This formulation is used for the early post-emergence control of crabgrass in desirable turf grasses growing in lawns and cemeteries. As soon as crabgrass can be identifield, usually in the 1 to 2 leaf stage, the above formulation is applied at the rate of 10 pounds of active compound per acre in 150 gallons of water. The growth of the crabgrass is retarded and the plants eventually die. The desirable turf (Merion and Kentucky bluegrass and red fescue) continues to grow normally without hindrance from the crabgrass.

In addition the 1-(3-methylcyclohexyl)-3-phenylurea wettable powder described above is further formulated into 5% active granules.

| | Percent |
|---|---|
| 1-(3-methylcyclohexyl)-3-phenylurea (as a 50% active wettable powder) | 10 |
| #4 vermiculite | 80 |
| Dodecylphenol polyethylene glycol ether | 5 |
| Water | 5 |

The wettable powder and the vermiculite are dry blended. The surfactant and water are combined and sprayed on the dry ingredients which are being tumbled in a blender.

The above formulation lends itself readily to distribution with tractor-drawn lawn spreader on golf fairways. Applying 10 pounds of active compound per acre in the spring before crabgrass germinates, results in excellent retardation of crabgrass. The crabgrass emerges but fails to grow normally. The desirable turf species, Merion and Kentucky bluegrass, red fescue and bentgrass, grow vigorously without competition from the crabgrass.

Example 168

The following compound is substituted for the 1-(3-methylcyclohexyl)-3-phenylurea in Example 167 in like amount by weight and is formulated and applied in like manner. Like results are obtained.

1-(1-methylcyclohexyl)-3-phenylurea

Example 169

The following emulsifiable oil can be extended with either oil or water:

| | Percent |
|---|---|
| 1-(3,4-dimethylcyclohexyl)-3-phenylurea | 20 |
| A blend of polyoxyethylene ethers and oil soluble sulfonates | 5 |
| Alkylated naphthalene (principally α-methylnaphthalene) | 75 |

The above components are blended and agitated until a homogeneous mixture is obtained.

This emulsifiable formulation is extended with 80 gallons of herbicidal oil and applied at the rate of 12 pounds active ingredient per acre to an area infested with foxtails and barnyardgrass. Excellent control of these weeds is obtained. Weed seeds germinating after treatment show severe retardation.

A pre-emergence application of the above formulation at the rate of 2 to 4 pounds of active ingredient per acre in 40 gallons of water gives excellent retardation of barnyardgrass in a newly-planted field of soybeans.

Example 170

*Granular formulation.*—The following granular composition is formulated:

| | Percent |
|---|---|
| 1-(2-methylcyclohexyl)-3-phenylurea | 2 |
| 15–30 mesh attapulgite granules | 98 |

The active material can be applied to the attaclay granules in several ways. (1) The active material may be dissolved in a volatile solvent such as acetone and sprayed on the tumbling granules, or (2) wettable powder containing the active material may be distributed on the surface of the granules. By moistening with water or a mixture of water and ethylene glycol dusting off is prevented. In other granular formulation, if the melting point of the active ingredient is below about 99° C., the active ingredient can be melted and sprayed over a tumbling mass of preferred clay-, vermiculite-, or similar granules.

This granular formulation is applied pre-emergence with a granule spreader at the rate of 2–5 pounds per acre for the control of growth of foxtail in an area of established bluegrass-meadow fescue. The foxtail emerges from the soil but fails to grow normally.

Example 171

The following wettable powder formulation is prepared:

| | Percent |
|---|---|
| 1-(2-methylcyclohexyl)-3-phenylurea | 52.6 |
| Pikes Peak clay (Montmorillonite) | 44.4 |
| Aerosal OT-B (Na dioctyl sulfosuccinate) | 1.5 |
| Na lignin sulfonate | 1.5 |

The above components are blended and micropulverized until homogeneous and then reblended.

The formulation described above is applied pre-emergence at the rate of 2 to 4 pounds of active ingredient per acre in 40 gallons of water for the control of foxtail, millet and barnyardgrass in a wide variety of economic crops. Excellent retardation of these weeds is obtained without significant injury to cucumbers, potatoes, tomatoes, squash, eggplant, peppers, red beets, sugar beets, carrots, okra, corn, cotton, flax, lima beans, red clover, lespedeza, soybeans, alfalfa, green beans and peanuts.

Example 172

The following wettable powder is suitable for any of the compounds described above which melt above 90° C.:

| | Percent |
|---|---|
| 1-(2-methylcyclohexyl)-3-phenylurea | 50 |
| Diatomaceous silica | 48 |
| Coconut acid ester of sodium isethionate | 1 |
| Sodium lauryl sulfate | 1 |

The ingredients are blended and micropulverized to pass a 60 mesh screen.

This wettable powder formulation in the amount of 2 pounds of active ingredient is added to 40 gallons of water in a spray tank. A surfactant such as trimethylnonyl polyethylene glycol ether is added to this mixture at the rate of 4 pounds. This tank spray mixture is applied to one acre of wheat just prior to emergence which is infested with cheat, not yet emerged or in the 1 to 2 leaf stage. Excellent retardation of cheat is obtained. The cheat offers poor competition and is crowded out by the wheat.

Example 173

A formulation example for 1-(2-methylcyclohexyl)-3-phenylurea follows:

| | Percent |
|---|---|
| 1-(2-methylcyclohexyl)-3-phenylurea | 25.00 |
| Hydrated attapulgite clay | 1.75 |
| $Na_2HPO_4$ | 0.80 |
| Sodium pentachlorophenate | 0.60 |
| Sodium lignin sulfonate | 15.00 |
| Water | 56.85 |

The above composition is mixed with an equal volume of Ottawa sand of 20–30 mesh and sandmilled for 45 minutes to yield a stable aqueous suspension which may be diluted with water for spray application.

This liquid dispersion is applied pre-emergence at the rate of 1.5 pounds of active ingredient per acre in 40 gallons of water for the regulation of cheat growth in newly-seeded fall wheat. Excellent retardation and control is obtained of the growth of cheat. The wheat seeds germinate normally and the plants compete successfully with the cheat.

Example 174

The following wettable powder can be diluted with water and applied as a post-emergence spray or it may be made up as a tank mix in conjunction with 0.2–5 parts of trimethylnonyl polyethylene glycol ether per part of active ingredient:

| | Percent |
|---|---|
| 1-cycloheptyl-3-phenylurea | 84 |
| Montmorillonite clay | 13 |
| Dioctyl sodium sulfosuccinate | 2 |
| Partially desulfonated sodium lignin sulfonate | 1 |

This wettable powder formulation is applied at the rate of 1.5 to 3.0 pounds of active ingredient in conjunction with 4 pounds of surfactant in 40 gallons of water as a post-emergence spray to young cheat in a field of newly-seeded wheat. Excellent retardation of growth of the cheat is obtained. Late germinating seedlings are retarded severely. Upon examination of the weeds, a severe retardation of the root system is noted. The wheat emerges from treatment and shows normal growth.

Example 175

The following wettable powder is applicable to the low melting solids described in the examples as well as all the high melting solid compounds of this invention.

| | Percent |
|---|---|
| 1-cyclopentyl-3-phenylurea | 25.00 |
| Alkyl naphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied pre-emergence at the rate of 1 to 3 pounds of active ingredient per acre in 40 gallons of water for the control of growth of cheat in a newly-seeded field of wheat. Excellent retardation of cheat is obtained without noticeable damage to the wheat.

Example 176

| | Percent |
|---|---|
| 1-(3-methylcyclohexyl)-3-phenylurea | 80 |
| Calcium lignin sulfonate | 2 |
| Alkyl naphthalene sulfonic acid, Na salt | 2 |
| $CaSO_4 \cdot 2H_2O$ | 1 |
| Tricalcium phosphate | 7 |
| Attapulgite clay | 8 |

The ingredients are mixed and micropulverized to a particle size essentially below 50 microns and then reblended.

The above formulation is applied pre-emergence at a rate of 2 pounds of active ingredient in 40 gallons of water for the control of growth of cheat in a wheat field. This application gives outstanding control of cheat. Germinating seedlings are retarded markedly. There is no visible effect on the wheat.

*Example 177*

High strength composition:

| | Percent |
|---|---|
| 1-(2-methylcyclohexyl)-3-phenylurea | 95.0 |
| Synthetic fine silica | 4.0 |
| Sodium dioctylsulfosuccinate | 0.5 |
| Sodium lignosulfonate | 0.5 |

The composition is prepared by blending the ingredients and passing the mixture through a hammer mill. Instead of the urea shown the other ureas shown in Examples 1, 2, 3, 4, 5, 6, and 7 can be substituted. The high strength composition can be used to prepare formulations such as are shown in Examples 8, 15, 132 or 161.

*Example 178*

The following composition is prepared by blending the ingredients and wet milling in a ball mill to obtain a uniform dispersion with a particle size less than 20 microns.

| | Percent |
|---|---|
| 1-(2-methylcyclohexyl)-3-phenylurea | 35 |
| Stoddard solvent | 63 |
| Soya lecithin | 2 |

This formulation may be extended with diesel oil.

The above formulation has utility for the control of Johnson grass seedlings in the 1 to 3 leaf stage as a directed post-emergence application of 3 to 6 pounds of active ingredient per acre in 20 gallons of diesel oil. It provides excellent control of Johnson grass growing in fields of cotton and sugar cane and retards the development of subsequently germinating Johnson grass.

*Example 179*

A 10-5-5 fertilizer mixture:

| | Percent |
|---|---|
| Diammonium phosphate | 10.9 |
| Ammonium sulfate | 36.5 |
| Tankage (4% N) | 15.0 |
| Potassium chloride | 8.4 |
| 1-(2-methylcyclohexyl)-3-phenylurea | 0.6 |
| Limestone | 28.6 |

The above mixture is prepared by blending the ingredients in regular fertilizer blending equipment. An application of 40 pounds of this mixture to 1000 square feet of turf gives a treatment of 1-(2-methylcyclohexyl)-3-phenylurea at a rate of 10 pounds per acre. An application of this mixture to establish turf before germination of weed grasses will result in good control of crabgrass and other seedling weed grasses, such as foxtail and barnyard grass.

*Example 180*

A 20-10-10 fertilizer mixture:

| | Percent |
|---|---|
| Diammonium phosphate | 21.70 |
| Urea | 17.50 |
| Ammonium sulfate | 39.50 |
| Potassium chloride | 16.70 |
| 1-(2-methylcyclohexyl)-3-phenylurea | 0.92 |
| Tankage (4% N) | 3.68 |

This mixture is prepared by blending the ingredients in regular fertilizer blending equipment. An application of this mixture to turf at a rate of 20 pounds per 1000 square feet gives a treatment of 8 pounds per acre of 1-(2-methylcyclohexyl)-3-phenylurea. The use of this mixture on turf at the indicated rate will result in good pre-emergence control of seedling weedy grasses such as crabgrass, barnyard grass and foxtails.

Thirty pounds of this fertilizer mixture gives excellent control of crabgrass in the 2 to 3 leaf stage.

*Example 181*

A 10-5-5 fertilizer chlordane mixture:

| | Percent |
|---|---|
| Diammonium phosphate | 10.90 |
| Ureaform (38% N) | 20.00 |
| Tankage (4% N) | 12.50 |
| Potassium chloride | 8.40 |
| 1-(2-methylcyclohexyl)-3-phenylurea | 0.35 |
| Chlordane | 0.35 |
| Limestone | 47.50 |

This mixture is prepared by blending the ingredients in regular fertilizer blending equipment. An application of this mixture to soil at a rate of 40 pounds per 1000 square feet gives a treatment of 6 pounds per acre of 1-(2-methylcyclohexyl)-3-phenylurea. The use of this mixture at the indicated rate will give good pre-emergence control of crabgrass in established Kentucky bluegrass.

*Example 182*

A lightweight 10-5-5 fertilizer

| | Percent |
|---|---|
| Ureaform | 15.8 |
| Ammonium sulfate | 19.0 |
| Potassium chloride | 8.4 |
| 1-(2-methylcyclohexyl)-3-phenylurea | 2.4 |
| Hydrated lime | 1.0 |
| Ferrous sulfate | 1.3 |
| Normal superphosphate | 18.9 |
| Triple superphosphate | 2.6 |
| Vermiculite #4 | 27.6 |
| Water | 3.0 |

This mixture is prepared by thoroughly blending the above ingredients in regular fertilizer blending equipment. An application of this mixture to soil at a rate of 10 pounds per 1000 square feet will result in an application of 10.4 pounds per acre of 1-(2-methylcyclohexyl)-3-phenylurea. The use of this mixture at the indicated rate will give good control of seedling weed grasses such as crabgrass, barnyardgrass and foxtails.

*Example 183*

Six to twelve pounds of a 80% wettable powder formulated in the manner of Example 176 but containing 1-(2-methylcyclohexyl)-3-phenylurea are blended with sufficient asphalt emulsion and grass seed to plant and stabilize an acre of new highway right-of-way. The grass seed may be one or more of the bluegrasses, fescues, or bentgrasses used for turf. This combination is sprayed on an area of sloping highway right-of-way with the equipment used to apply seed and an asphalt emulsion.

The addition of the substituted urea to the asphalt seed combination provides control of annual weedy grasses such as crabgrass (Digitaria spp.), foxtail (Setaria spp.), barnyardgrass (*Echinochloa crusgalli*), downy bromegrass (*Bromus tectorum*), and seedling Johnson grass (*Sorghum halepense*). These weedy grasses often prevent the establishment of a stand of the desirable turf grasses, particularly when the seeding is performed in the spring or summer. The use of this chemical permits the successful seeding of the cool season turf species at any time during the growing season when sufficient water is available for their establishment.

*Example 184*

A combination of cool season turf grass seed and wood fiber, e.g., "Turfiber®," is used to seed and stabilize new turf areas. The addition to this combination of 6 to 12 pounds of an 80% wettable powder formulation formulated in the manner of Example 176 but containing 1-(2-methylcyclohexyl)-3-phenylurea provides control of annual weedy grasses and the same advantages enumerated in Example 183.

I claim:
1. Method for preparing seed suitable for establishing a perennial turf grass substantially free from crabgrass comprising applying to perennial turf grass seed, based on a weight of 174 pounds of perennial turf grass seed, from 1 to 55 pounds of a compound of the formula:

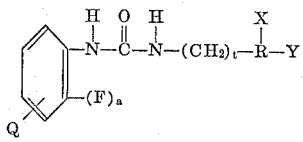

wherein:
R is selected from the group consisting of saturated cycloalkyl of 5 through 8 carbon atoms and saturated bicycloalkyl of 7 through 8 carbon atoms;
X and Y are each separately selected from the group consisting of hydrogen, halogen, methyl and ethyl;
$a$ and $t$ are each separately selected from the group consisting of 0 and 1;
Q is selected from the group consisting of hydrogen and methyl; and with the limitation that when R is selected from the group consisting of cycloheptyl, cyclooctyl and bicycloalkyl, Q must be in the meta position if methyl and X and Y are separately selected from the group consisting of hydrogen, halogen and methyl.

2. Method according to claim 1 wherein the compound is 1-(2-methylcyclohexyl)-3-phenylurea.
3. Method according to claim 1 wherein the compound is 1-(3-methylcyclohexyl)-3-phenylurea.
4. Method according to claim 1 wherein the compound is 1-cycloheptyl-3-phenylurea.
5. Method according to claim 1 wherein the compound is 1-cyclooctyl-3-phenylurea.
6. Method according to claim 1 wherein the compound is 1-(o-fluorophenyl)-3-(2-methylcyclohexyl)urea.
7. Method according to claim 1 wherein the compound is 1-(o-fluorophenyl)-3-(3-methylcyclohexyl)urea.
8. Method according to claim 1 wherein the compound is 1-(2-methylcyclohexylmethyl)-3-phenylurea.
9. Method according to claim 1 wherein the compound is 1-(3-methylcyclohexylmethyl)-3-phenylurea.
10. Method according to claim 1 wherein the compound is 1-(2-chlorocyclohexyl)-3-phenylurea.
11. Method according to claim 1 wherein the compound is 1-cyclohexylmethyl-3-phenylurea.
12. Method according to claim 1 wherein the compound is 1-(2-methylcyclohexyl)-3-m-tolylurea.
13. Method according to claim 1 wherein the compound is 1-(norbornylmethyl)-3-phenylurea.

References Cited

UNITED STATES PATENTS

| 2,671,985 | 3/1954 | Vogelsong | 71—2.2 X |
| 2,967,376 | 1/1961 | Scott | 71—2.21 X |
| 3,001,861 | 9/1961 | Fischer et al. | 71—2.6 |
| 3,149,954 | 9/1964 | Harrod | 71—2.5 |

FOREIGN PATENTS

| 500,284 | 2/1939 | Great Britain. |
| 509,282 | 7/1939 | Great Britain. |

LEWIS GOTTS, *Primary Examiner.*
JAMES O. THOMAS, Jr., *Examiner.*